United States Patent
Tsai et al.

(10) Patent No.: US 11,300,491 B2
(45) Date of Patent: Apr. 12, 2022

(54) CONDENSING SYSTEM

(71) Applicant: CHROMA ATE INC., Tao-Yuan (TW)

(72) Inventors: Cheng-Ting Tsai, Tao-Yuan (TW);
Lan-Sheng Yang, Tao-Yuan (TW);
Shao-En Chung, Tao-Yuan (TW)

(73) Assignee: CHROMA ATE INC., Tao-Yuan (TW)

( * ) Notice: Subject to any disclaimer, the term of this patent is extended or adjusted under 35 U.S.C. 154(b) by 239 days.

(21) Appl. No.: 16/676,458

(22) Filed: Nov. 7, 2019

(65) Prior Publication Data

US 2020/0166445 A1 May 28, 2020

(30) Foreign Application Priority Data

Nov. 23, 2018 (TW) ................................ 107141943

(51) Int. Cl.
*F28B 1/06* (2006.01)
*G01N 13/00* (2006.01)

(52) U.S. Cl.
CPC .................................. *G01N 13/00* (2013.01)

(58) Field of Classification Search
CPC ...... B01D 5/00; B01D 5/0051; B01D 5/0003; B01D 5/0027; B01D 5/0012; B01D 5/0015; B01D 5/003; B01D 5/0033; B01D 5/0054; B01D 5/0075; B01D 5/0039; B01D 5/0081; B01D 5/0084; B01D 8/00; G01N 13/00; F28B 1/00; F28B 1/06; F28B 11/00; F24F 13/10; F24F 2013/088
USPC ............................................................ 137/8
See application file for complete search history.

(56) References Cited

U.S. PATENT DOCUMENTS

| 9,038,669 | B2 * | 5/2015 | Kumar | F16L 55/02718 |
| | | | | 138/46 |
| 2016/0229706 | A1 * | 8/2016 | Ackerman | B01D 5/0054 |
| 2016/0290373 | A1 * | 10/2016 | Suganuma | F23C 5/32 |

FOREIGN PATENT DOCUMENTS

| CN | 2624405 Y | 7/2004 | | |
| CN | 102778461 A | 11/2012 | | |
| CN | 203130679 U | * 8/2013 | | |
| DE | 102017108170 A1 | * 10/2018 | ........... | B01D 53/261 |
| JP | 56-133330 U | 10/1981 | | |
| JP | H05240797 A | 9/1993 | | |
| JP | H05340885 A | 12/1993 | | |
| JP | 2009195563 A | 9/2009 | | |
| JP | 2020085903 A | 6/2020 | | |
| TW | 580243 | 3/2004 | | |
| WO | WO-2010150005 A1 | * 12/2010 | ........... | B01D 5/0033 |

* cited by examiner

*Primary Examiner* — Herbert K Roberts
*Assistant Examiner* — Fatemeh Esfandiari Nia
(74) *Attorney, Agent, or Firm* — CKC & Partners Co., LLC

(57) ABSTRACT

A condensing system is used to generate a condensing layer on a surface of a test object. The condensing system includes airflow generating device and a passage device. The airflow generating device is used to generate condensing airflow. The condensing airflow has a dew point higher than a temperature of the surface of the test object. The passage device is connected to the airflow generating device, and the condensing airflow flows from the airflow generating device into the passage device. The passage device includes a flow-uniforming module. The flow-uniforming module includes at least one uniforming board. Each of the at least one uniforming board has at least a first hole.

12 Claims, 6 Drawing Sheets

CONDENSING SYSTEM

RELATED APPLICATIONS

This application claims priority to Taiwan Application Serial Number 107141943, filed Nov. 23, 2018, which is herein incorporated by reference in its entirety.

BACKGROUND

Field of Invention

The present invention relates to a condensing system. More particularly, the present invention relates to a condensing system used for generating a condensing layer on a surface of a test object.

Description of Related Art

To generate a condensing layer on a surface of an object, the object should be located into a sealed chamber with a low temperature to be cooled down. Subsequently, the cooled object is located within the gas with high humidity. After the gas with high humidity is cooled, the vapor of the gases will condense on the surface of the object and form a condensing layer.

The disadvantage of above method is that, to generate the condensing layer, the object should enter and exit the sealing chamber such that the generating process is difficult to be automated. Furthermore, manufacturing a sealing chamber is costly, and it needs a lot of time to generate the environment with low temperature in the sealing chamber. Therefore, one of the important subjects in the field is to find an easy, quick and low cost way to generate the condensing layer on the object.

SUMMARY

According to some embodiments of the present disclosure, a condensing system used for generating a condensing layer on a surface of a test object includes an airflow generating device and a passage device. The airflow generating device is used for generating a condensing airflow. The condensing airflow has a dew point higher than a temperature of the surface of the test object. The passage device is communicated to the airflow generating device. The condensing airflow from the airflow generating device flows into the passage device. The passage device includes a flow-uniforming module. The flow-uniforming module is close to the airflow generating device and is configured to receive the condensing airflow. The flow-unforming module includes at least one uniforming board. Each of the at least one uniforming board has at least one first hole.

According to some embodiments of the present disclosure, a condensing system used for generating a condensing layer on a surface of a test object includes an airflow generating device and a passage device. The airflow generating device is used for generating a condensing airflow. The condensing airflow has a dew point higher than a temperature of the surface of the test object. The passage device includes a passage body and at least one uniforming board. The passage body is communicated to the airflow generating device. The airflow outlet is communicated between the controller and the passage body. The at least one uniforming board is parallel located in the passage body and configured to receive the condensing airflow. The at least one uniforming board has at least one first hole.

In some embodiments, the flow-uniforming module further includes a spacer. The spacer is configured at a side of one of the uniforming boards. The side is opposite to the airflow generating device. A vertical projection of the spacer on the corresponding uniforming board partially covers the at least one first hole.

In some embodiments, the passage device further includes a flow-rectifying module. The flow-rectifying module is on a side of the flow-uniforming module. The side is opposite to the airflow generating device. The flow-rectifying device includes a flow-rectifying board. The flow-rectifying board has at least one second hole. The flow-rectifying board has a greater thickness than that of any of the at least one uniforming board.

In some embodiments, the airflow generating device further includes an airflow inlet, a heater, a humidifier, a controller, an airflow outlet and a fan. The airflow inlet is configured to cause an environmental airflow to flow into the airflow generating device. The heater is communicated to the airflow inlet and configured to heat the environmental airflow to generate a first airflow. The humidifier is communicated to the heater and configured to humidify the first airflow to generate a second airflow. The controller is communicated to the humidifier and configured to control a temperature and humidity of the second airflow to generate the condensing airflow according to the temperature of the surface of the test object. The airflow outlet is communicated between the controller and the passage device. The fan is located at the airflow inlet or the airflow outlet and configured to transfer the condensing airflow forcibly.

In some embodiments, the number of the at least one uniforming board is plural. A first uniforming board of the uniforming boards is farther from the airflow generating device than a second uniforming board of the uniforming boards. The first uniforming board is farther from the airflow generating device than the second uniforming board. The first uniforming board has more of the at least one first holes than the second uniforming board.

In some embodiments, the number of the at least one uniforming board is plural. A first uniforming board of the uniforming boards is farther from the airflow generating device than a second uniforming board of the uniforming boards. The first uniforming board is farther from the airflow generating device than the second uniforming board. One of the at least one first hole of the first uniforming board has a smaller size than one of the at least one first hole of the second uniforming board.

In some embodiments, the number of the at least one uniforming board is plural. A first uniforming board of the uniforming boards is farther from the airflow generating device than a second uniforming board of the uniforming boards. The first uniforming board is farther from the airflow generating device than the second uniforming board. A total area of the at least one first hole on the first uniforming board is greater than a total area of the at least one first hole on the second uniforming board.

In summary, the condensing system in the present disclosure can control a lot of properties of the condensing airflow to generate a condensing layer with great quality on the test object. For example, the condensing system can control the temperature and the humidity of the condensing airflow through the airflow generating system (to determine the dew point of the condensing air), and the condensing system can control the wind speed, the uniformity of the wind speed and the direction of the condensing airflow.

DETAILED DESCRIPTION

The following embodiments are disclosed with accompanying diagrams for detailed description. For illustration clarity, many details of practice are explained in the following descriptions. However, it should be understood that these details of practice do not intend to limit the present invention. That is, these details of practice are not necessary in parts of embodiments of the present invention. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

Figure 1A:
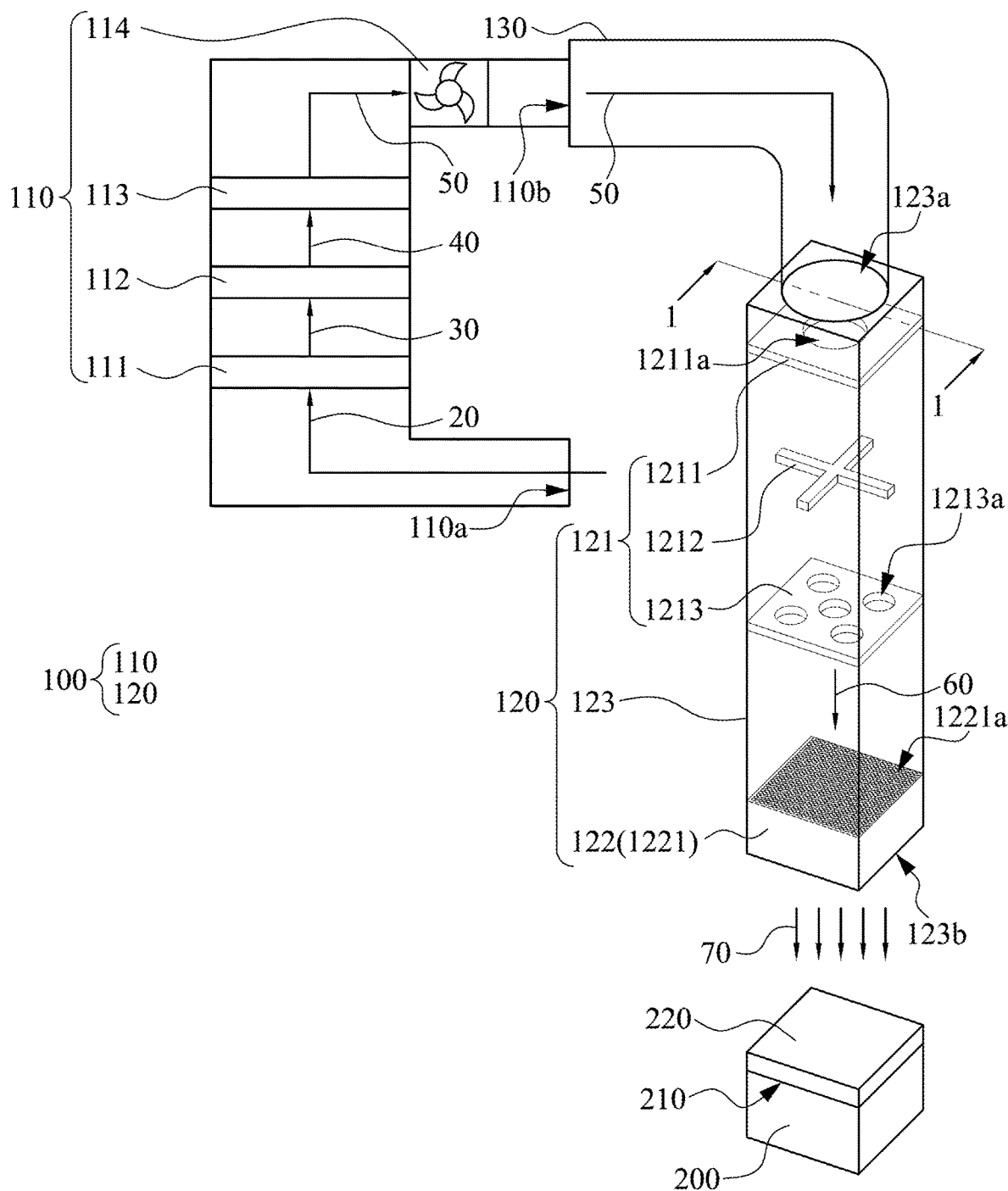
FIG. 1A is a perspective view of a condensing system according to one embodiment of the present disclosure.

Please refer to FIG. 1A. FIG. 1A is a perspective view of a condensing system 100 according to one embodiment of the present disclosure. As shown in FIG. 1A, the condensing system 100 is used to generate a condensing layer 220 on the surface 210 of the test object 200. The condensing system 100 includes an airflow generating device 110 and passage device 120.

The airflow generating device 110 is used to generate condensing airflow 50. The condensing airflow 50 has a higher dew point than the temperature of the surface 210 of the test object 200. The passage device 120 is communicated to the airflow generating device 110 such that the condensing airflow 50 flows into the passage device 120 from the airflow generating device 110.

The passage device 120 includes a flow-uniforming module 121. The flow-uniforming module 121 is close to the airflow generating device 110. The flow-uniforming module 121 is configured to receive the condensing airflow 50. The flow-uniforming module 121 includes an uniforming board 1211, a spacer 1212 and an uniforming board 1213. The uniforming board 1211 includes a hole 1211a. The uniforming board 1213 includes holes 1213a. In one embodiment, the passage device 120 further includes a flow-rectifying module 122. The flow-rectifying module 122 is on the side of the flow-uniforming module 121 opposite to the airflow generating device 110. The flow-rectifying module 122 is configured to receive a uniform condensing airflow 60, wherein the uniform condensing airflow 60 has passed through the flow-uniforming module 121. The flow-rectifying module 122 includes a flow-rectifying board 1221. The flow-rectifying board 1221 has a plurality of holes 1221a.

As shown in FIG. 1A, the airflow generating device 110 has an airflow inlet 110a and an airflow outlet 110b. The airflow inlet 110a is configured for the environment airflow 20 into the airflow generating device 110. The airflow generating device 110 is configured to change the temperature and the humidity of the environment airflow 20. The airflow generating device 110 makes the environment airflow 20 into the condensing airflow 50. Afterwards, the condensing airflow 50 exits the airflow generating device 110 through the airflow outlet 110b of the airflow generating device 110.

As shown in FIG. 1A, the airflow generating device 110 can further include a fan 114 inside the airflow generating device 110. In this embodiment, the fan 114 is configured at one end adjacent to the airflow outlet 110b. In some embodiments, the fan 114 can be configured at one end close to the airflow inlet 110a. The fan 114 is configured to provide the difference of the air pressure between the external environment and the airflow generating device 110, such that the condensing airflow 50 flows into the passage device 120 from the air generating device 110. That is, the fan 114 is configured to ensure that the airflow generating device 110 can continuously draw in the environment airflow 20 from the external environment and exhaust the condensing airflow 50.

As shown in FIG. 1A, the airflow generating device 110 can further include various components inside the airflow generating device 110 to adjust the temperature and the humidity of the environment airflow 20. For example, in this embodiment, a heater 111, a humidifier 112 and a controller 113 are inside the airflow generating device 110, wherein the controller 113 is used to adjust the temperature and the humidity of an airflow.

In this embodiment, after the environment airflow 20 flows into the airflow generating device 110, the environment airflow 20 passes through the heater 111, the humidifier 112 and the controller 113 for adjusting the temperature and the humidity sequentially. In other embodiments, the order of the heater 111, the humidifier 112 and the controller 113 in the airflow generating device 110 are adjustable. The order shown in FIG. 1A is merely one of the embodiments of this disclosure, and this disclosure is not limited to this embodiment.

As shown in FIG. 1A, the heater 111 is communicated to the airflow inlet 110a. The heater 111 is configured to heat the environment air 20. After the environment air 20 passes through the heater 111, the environment air 20 becomes a first airflow 30. The first airflow 30 has a higher temperature than the environment airflow 20.

As shown in FIG. 1A, the humidifier 112 is communicated to the heater 111. The humidifier 112 is configured to humidify the first airflow 30. After the first airflow 30 passes through the humidifier 112, the first airflow 30 becomes a second airflow 40. The second airflow 40 has higher humidity than the first airflow 30.

As shown in FIG. 1A, the controller 113 for adjusting the temperature and the humidity of airflow is communicated to the humidifier 112. The controller 113 is configured to adjust the temperature and the humidity of the second airflow 40. After the second airflow 40 passes through the controller 113, the second airflow 40 becomes the condensing airflow 50. The controller 113 determines the temperature and the humidity of the condensing airflow 50. In this embodiment, the controller 113 can slightly reduce the temperature and the humidity of the second airflow 40 such that the condensing airflow 50 has a slightly lower temperature and slightly lower humidity than the second airflow 40.

In some embodiments, the temperature and the humidity of the condensing airflow 50 can be determined in accordance with the temperature of the surface 210 of the test object 200. For example, to generate the condensing layer 220 on the surface 210 of the test object 200, the condensing airflow 50 is adjusted to have a higher dew point than the temperature of the surface 210 of the test object 200. When the condensing airflow 50 contacts the surface 210 of the test object 200, the condensing airflow 50 is cooled down to generate the condensing layer 220 on the surface 210.

In some embodiments, by the combination of the heater 111, the humidifier 112 and the controller 113 for adjusting the temperature and the humidity, the dew point of the condensing airflow 50, which is generated by the airflow generating device 110, can be adjusted accurately. For example, users can choose a determined temperature and determined humidity in advance and make the environment airflow 20 into a first airflow 30 by using the heater 111, wherein the first airflow 30 has a temperature close to the determined temperature. Then, users can make the first airflow 30 into a second airflow 40 by using the humidifier 112, wherein the humidity of the second airflow 40 is close to the determined humidity. Finally, users can adjust the second airflow 30 a little by using the controller 113 to make the second airflow 40 into the condensing airflow 50 with the determined temperature and the determined humidity.

Specifically, as shown in Table 1 below, it presents an example of the temperature and humidity comparison table of the environment airflow 20, the first airflow 30, the second airflow 40 and the condensing airflow 50.

TABLE 1

|  | temperature (Celsius) | humidity |
|---|---|---|
| environment airflow 20 | 25 | 60% |
| first airflow 30 | 40 | 60% |
| second airflow 40 | 40 | 90% |
| condensing airflow 50 | 35 | 90% |

As shown in Table 1, the first airflow 30 has a higher temperature than the environment airflow 20; the second airflow 40 has higher humidity than the first airflow 30; and the condensing airflow 50 has a slightly lower temperature and slightly lower humidity than the second airflow 40.

Return to FIG. 1A, the condensing airflow 50 generated by the airflow generating device 110 is transferred into the passage device 120. In this embodiment, the airflow generating device 110 is communicated to the passage device 120 by a duct 130, such that the condensing airflow 50 flows into the passage device 120 through the duct 130 after the condensing airflow 50 exits from the airflow generating device 110.

As shown in FIG. 1A, the passage device 120 has a passage body 123. The passage body 123 has an inlet end 123a and an outlet end 123b. The inlet end 123a receives the condensing airflow 50 generated by the airflow generating device 110. After flowing into the passage device 120, the condensing airflow 50 passes through the flow-uniforming module 121 and the flow-rectifying module 122 sequentially, wherein both the flow-uniforming module 121 and the flow-rectifying module 122 are in the passage device 120. The flow-uniforming module 121 receives the condensing airflow 50 and makes the condensing airflow 50 into the uniform condensing airflow 60. The flow-rectifying module 122 receives the uniform condensing airflow 60 and makes the uniform condensing airflow 60 into a directional condensing airflow 70. The directional condensing airflow 70 exits the passage device 120 from an outlet end 123b and is ejected to the surface 210 of the test object 200.

Figure 1B:
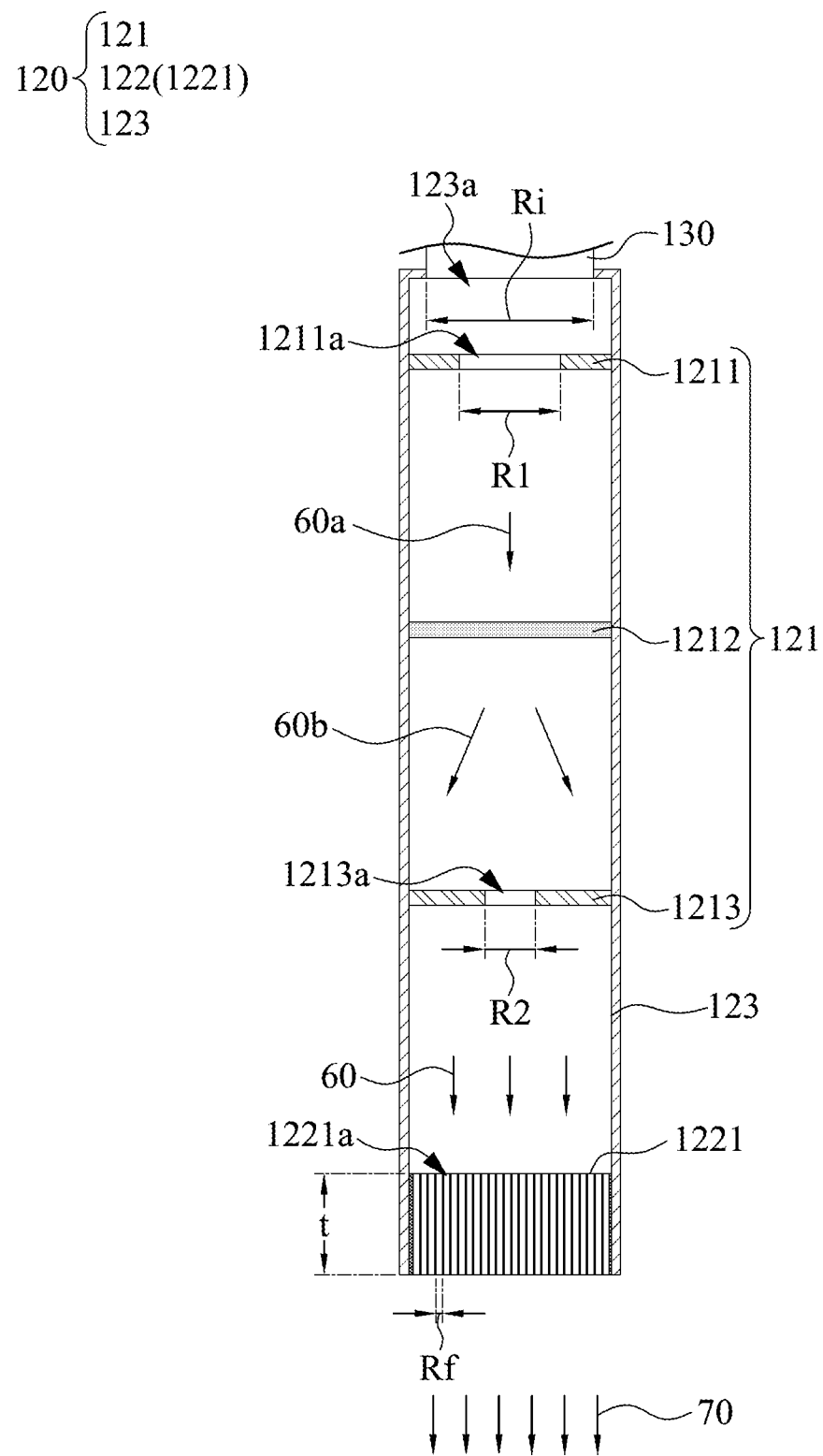
FIG. 1B is a cross-section along the line 1-1 in FIG. 1A.

FIG. 1B is a cross-section along the line 1-1 in FIG. 1A. As shown in FIG. 1A and FIG. 1B, the inlet end 123a of the passage device 120 has an aperture Ri, the hole 1211a of the uniforming board 1211 has an aperture R1, the hole 1213a of the uniforming board 1213 has an aperture R2, and the hole 1221a of the flow-rectifying board 1221 has an aperture Rf.

In this embodiment, the number of the holes 1211a of the uniforming board 1211 that is closer to airflow generating device 110 is one, and the number of the holes 1213a of the uniforming board 1213 that is farther from the airflow generating device 110 is five. That is, the uniforming board 1213 that is farther from the airflow generating device 110 has more holes. In addition, the aperture R1 of the uniforming board 1211 is larger than the aperture R2 of the uniforming board 1213, wherein the uniforming board 1211 is closer to the airflow generating device 110, and the uniforming board 1213 is farther from the airflow generating device 110. The above arrangement enables the condensing airflow 50 becomes the uniform condensing airflow 60 after the condensing airflow 50 passes through the flow-uniforming module 121, as will be explained hereinafter.

As shown in FIGS. 1A and 1B, after the condensing airflow 50 passes through the uniforming board 1211, the wind speed and the wind speed distribution of the condensing airflow 50 are changed, and it is labeled as airflow 60a. The airflow 60a is constrained in a smaller region by the aperture R1, therefore, the airflow 60a has a larger wind speed, and the wind speed distribution of the airflow 60a is concentrated in the center.

Then, the airflow 60a arrives the spacer 1212, the wind speed and the wind speed distribution of the airflow 60a are further changed, and it is labeled as airflow 60b. The vertical projection of the spacer 1212 on the uniforming board 1211 covers the hole 1211a partially, therefore, the flowing direction of the airflow 60a can be changed because of the collision to the spacer 1212. That is, compared with the airflow 60a, the airflow 60b has a lower wind speed, and airflow 60b has a wilder wind speed distribution than the airflow 60a. In this embodiment, the spacer 1212 is a cross but not limited to this embodiment.

Then, the airflow 60b passes through the uniforming board 1213, the wind speed and the wind speed distribution of the airflow 60b are changed, and the airflow 60b becomes the uniforming condensing airflow 60. Specifically, because the holes 1213a are uniformly distributed on the uniforming board 1213, the uniform condensing airflow 60 uniformly flows out from each of the holes 1213a of the uniforming board 1213, and the wind speed of each of uniform condensing airflow 60 is also nearly uniform.

In this embodiment, the area of the holes 1211a on the uniforming board 1211 is smaller than the total area of all holes 1213a on the uniforming board 1213. That is, the open area (total area of holes) of the uniforming board 1213 which is relatively far from the airflow generating device 110 is larger, and it can be known that the uniform condensing airflow 60 passing through uniforming board 1211 has slower and more uniform wind speed than the airflow 60a passing through the flow uniforming board 1211 according to the Bernoulli's principle. The slow and uniform airflow characteristics help the condensing system 100 form the condensing layer 220 that is uniformly flat on the test object 200.

As shown in FIG. 1A and FIG. 1B, the uniform condensing airflow 60 passes through the flow-uniforming module 122 before contacting the test object 200 to further improve the direction of the uniform condensing airflow 60. Therefore, the uniform condensing airflow 60 becomes the directional condensing airflow 70.

In this embodiment, the thickness t of the flow-rectifying board 1221 of the flow-rectifying module 122 is respectively larger than the thickness of the uniforming board 1211, the spacer 1212 and the uniforming board 1213. That is, the holes 1221a in the uniforming board 1221 can be regarded as separate small tubes. After the uniform condensing airflow 60 enters the holes 1221a, the uniform condensing airflow 60 flows in a consistent direction. Therefore, the uniform condensing airflow 60 becomes the directional condensing airflow 70.

In this embodiment, the gap between the uniforming board 1211 and spacer 1212, the gap between the spacing 1212 and the uniforming board 1213 and the gap of the uniforming board 1213 and the flow-rectifying board 1221 seen to be equal, however, it is not limited to this embodiment. That is, the gap above can be different each other.

It should be understood that the passage device 120 illustrated in FIG. 1A and FIG. 1B is merely an example and those skilled in the art can perform the modification according to the design principles presented above. For example, the passage device 120 of this embodiment includes two uniforming boards (1211, 1213). However, in other embodiments, the passage device 120 can include three, four or even more uniforming boards.

Figure 2A:
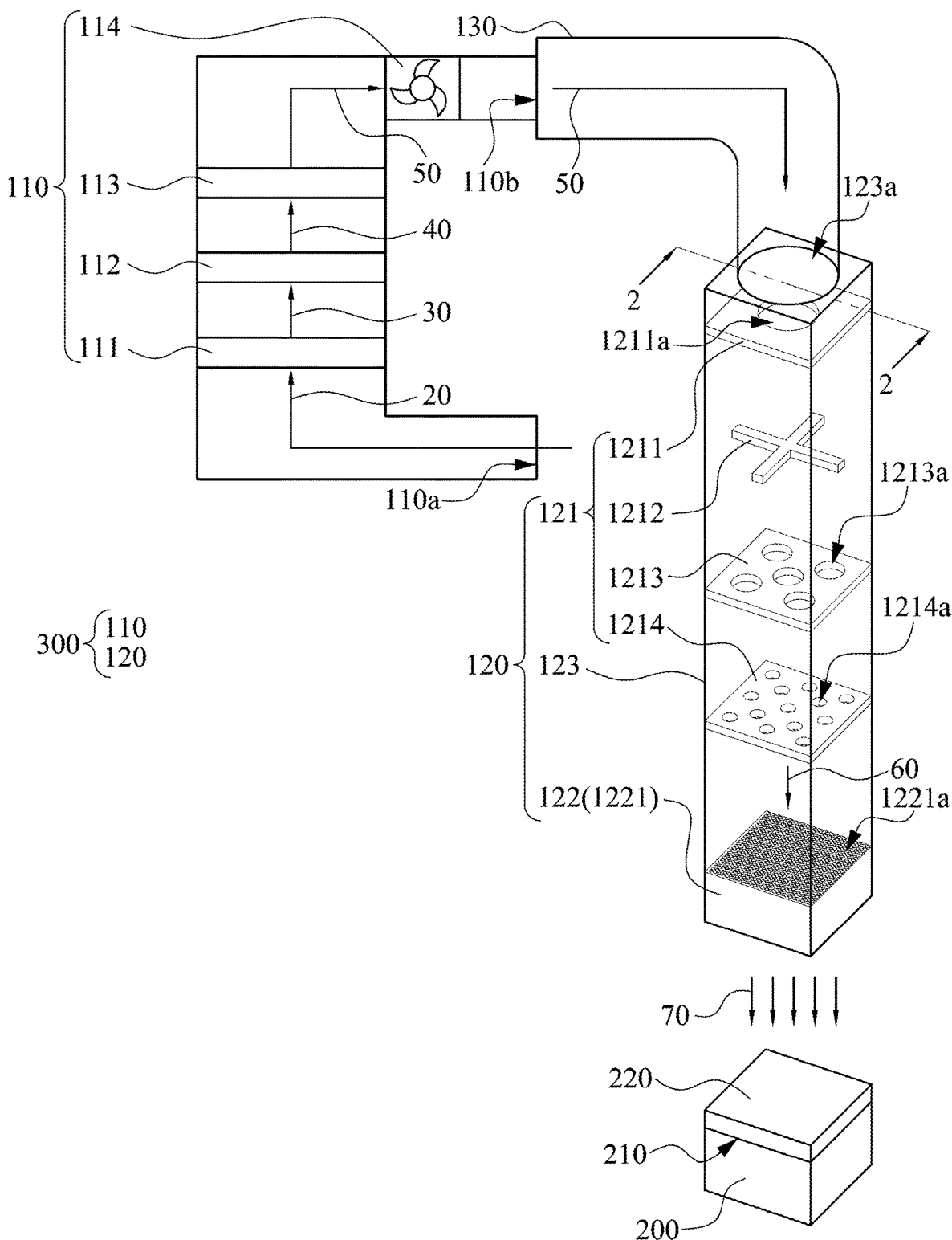
FIG. 2A is a perspective view of a condensing system according to another embodiment of the present disclosure.
Figure 2B:
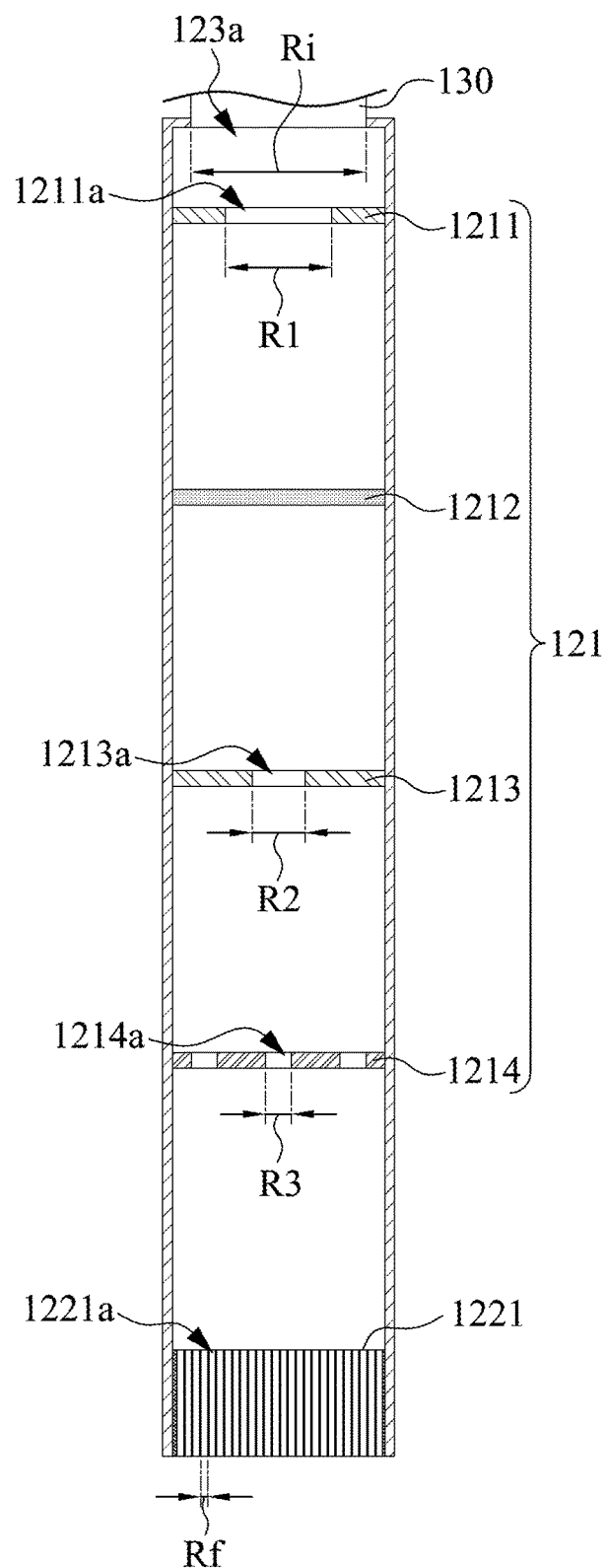
FIG. 2B is a cross-section along the line 2-2 in FIG. 2A.

Specifically, please refer to FIG. 2A and FIG. 2B. FIG. 2A is a perspective view of a condensing system 300 according to another embodiment of the present disclosure. FIG. 2B is a cross-section along the line 2-2 in FIG. 2A. The difference between the condensing system 300 and the condensing system 100 is that the passage device 120 of the condensing system 300 includes three uniforming boards 1211, 1213 and 1214. That is, the passage device 120 of the condensing system 300 further includes the uniforming board 1214. The uniforming board 1214 has a plurality of holes 1214a. For example, the number of the holes 1214a is 13.

That is, compared with the uniforming board 1211 and the uniforming board 1213, the number of the holes 1214a of the uniforming board 1214 is greater, the aperture R3 of the holes 1214a is smaller, and the total area of all the holes 1214a is larger. By providing the uniforming board 1214 in the passage device 120, the wind speed of the airflow passing through the uniforming board 1214 (refer to FIG. 2B) can be further reduced and the wind speed uniformity can be increased to suit the practical needs.

Figure 3A:
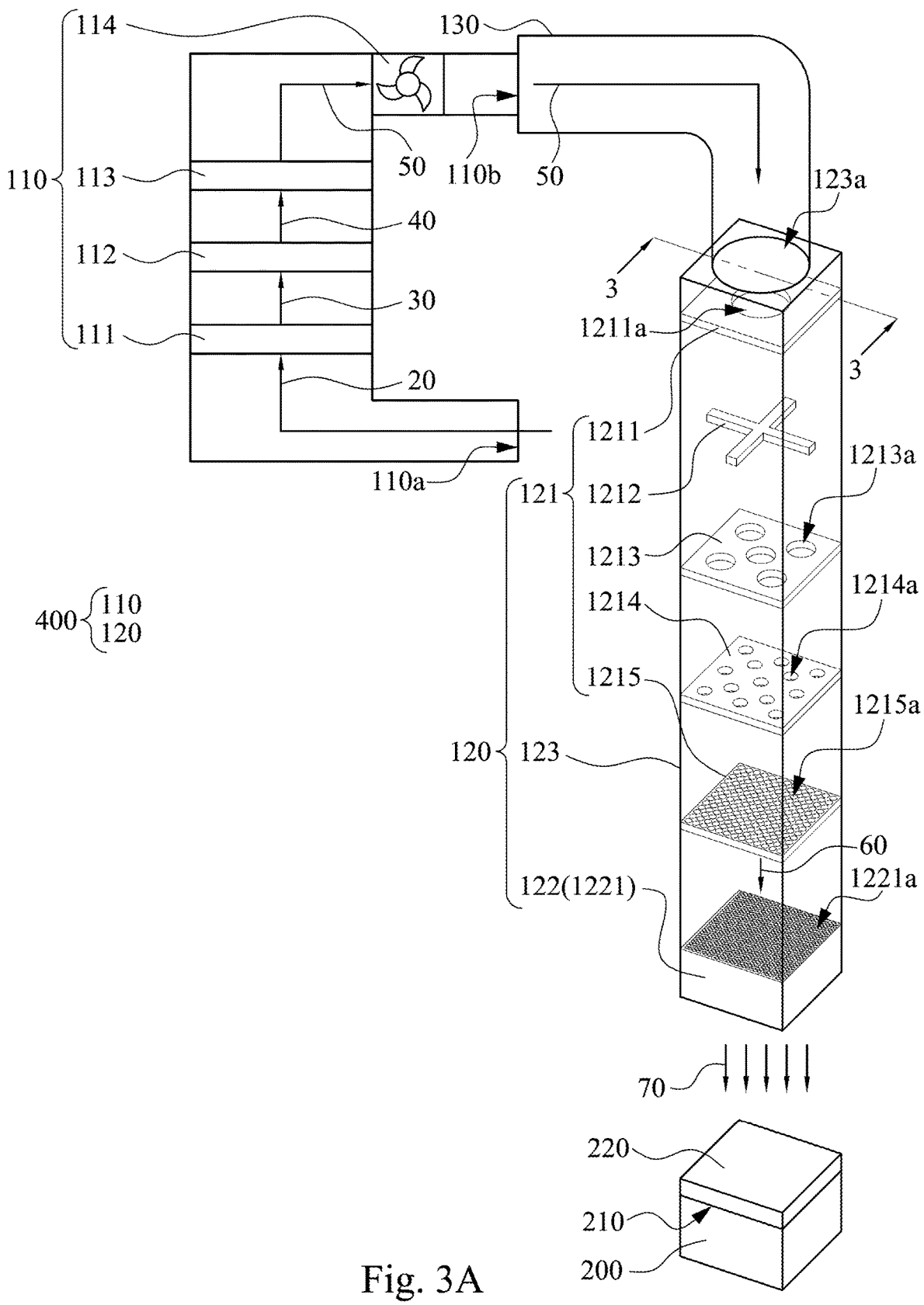
FIG. 3A is a perspective view of a condensing system according to another embodiment of the present disclosure.
Figure 3B:
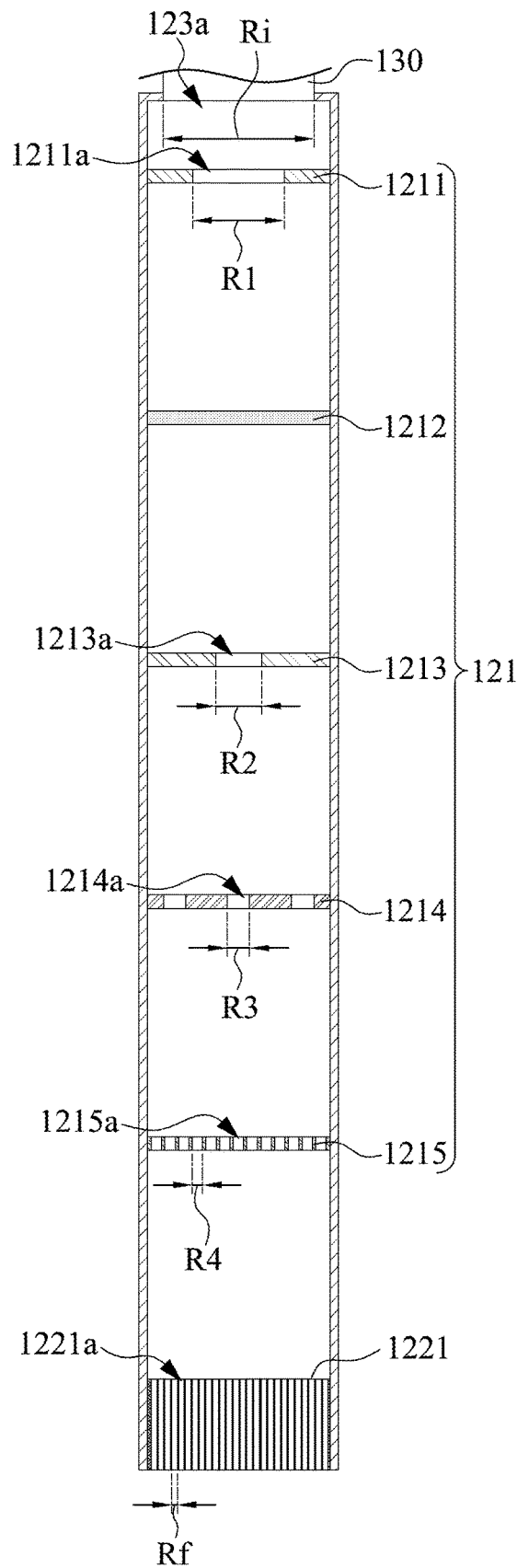
FIG. 3B is a cross-section along the line 3-3 in FIG. 3A.

Please refer to FIG. 3A and FIG. 3B. FIG. 3A is a perspective view of a condensing system 400 according to another embodiment of the present disclosure. FIG. 3B is a cross-section along the line 3-3 in FIG. 3A. The difference between the condensing system 400 and the condensing system 300 is that the passage device 120 of the condensing system 400 includes four uniforming boards 1211, 1213, 1214 and 1215. That is, the passage device 120 of the condensing system further includes the uniforming board 1215. The uniforming board 1215 has a plurality of holes 1215a. For example, the number of the holes 1215a is 169.

That is, compared with the uniforming board 1211, the uniforming board 1213 and the uniforming board 1214, the number of the holes 1215a of the uniforming board 1215 is greater, the aperture R4 of the hole 1215a is smaller, and the total area of all the holes 1215a is larger. By providing the uniforming board 1215 in the passage device 120, the wind speed of the airflow through the uniforming board 1215 (refer to FIG. 3B) can be further reduced, and the wind speed uniformity can be increased to suit the practical needs.

In summary, the condensing system proposed by the present disclosure can control many characteristics of the condensing airflow to promote the formation of a condensing layer with a good quality on the surface of the test object. For example, through the airflow generating device, the condensing system can adjust the temperature and the humidity of the condensing airflow to determine the dew point of the condensing airflow. The condensing system can also control the wind speed, the uniformity of the wind speed and the direction of the condensing airflow through the passage device.

This disclosure has been described by the foregoing examples and embodiments, and it should be understood that this disclosure is not limited to the disclosed embodiments. On the contrary, the present invention is intended to include a variety of modifications and approximate designs (as would be apparent to those of ordinary skill in the art). Therefore, additional claims should be based on the broadest interpretation to include all such modifications and designs.

What is claimed is:

1. A condensing system used for generating a condensing layer on a surface of a test object, the condensing system comprising:
    an airflow generating device used for generating a condensing airflow, wherein the condensing airflow has a dew point higher than a temperature of the surface of the test object, the airflow generating device comprising:
        an airflow inlet configured to cause an environmental airflow to flow into the airflow generating device;
        a heater communicated to the airflow inlet and configured to heat the environmental airflow to generate a first airflow;
        a humidifier communicated to the heater and configured to humidify the first airflow to generate a second airflow;
        a controller communicated to the humidifier and configured to control a temperature and humidity of the second airflow to generate the condensing airflow according to the temperature of the surface of the test object; and
        an airflow outlet; and
        a fan disposed at the airflow inlet or the airflow outlet and configured to transfer the condensing airflow forcibly; and
    a passage device communicated to the airflow generating device and receiving the condensing airflow from the airflow generating device, wherein the airflow outlet is communicated between the controller and the passage device, the passage device comprising:
        a flow-uniforming module disposed close to the airflow generating device and configured to receive the condensing airflow, wherein the flow-uniforming module comprising at least one uniforming board, and each of the at least one uniforming board has at least one first hole; and
        a flow-rectifying module on a side of the flow-uniforming module, wherein the side is opposite to the airflow generating device, the flow-rectifying module is configured to receive the condensing airflow passing through the flow-uniforming module, the flow-rectifying module comprises a flow-rectifying board, and the thickness of the flow-rectifying board is greater than a thickness of any of the uniforming boards.

2. The condensing system of claim 1, wherein the flow-uniforming module further comprising:
    a spacer disposed at a side of uniforming board, wherein the side is opposite to the airflow generating device, a vertical projection of the spacer partially covers the at least one first hole.

3. The condensing system of claim 1, wherein the flow-rectifying board comprises at least one second hole.

4. The condensing system of claim 1, wherein the number of the at least one uniforming board is plural, a first uniforming board of the uniforming boards is farther from the airflow generating device than a second uniforming board of the uniforming boards, and the first uniforming board has more of the at least one first holes than the second uniforming board.

5. The condensing system of claim 1, wherein the number of the at least one uniforming board is plural, a first uniforming board of the uniforming boards is farther from the airflow generating device than a second uniforming board of the uniforming boards, and one of the at least one first hole of the first uniforming board has a smaller size than one of the at least one first hole of the second uniforming board.

6. The condensing system of claim 1, wherein the number of the at least one uniforming board is plural, a first uniforming board of the uniforming boards is farther from the airflow generating device than a second uniforming board of the uniforming boards, and a total area of the at least one first hole on the first uniforming board is greater than a total area of the at least one first hole on the second uniforming board.

7. A condensing system used for generating a condensing layer on a surface of a test object, the condensing system comprising:
   an airflow generating device used for generating a condensing airflow, wherein the condensing airflow has a dew point higher than a temperature of the surface of the test object, the airflow generating device comprising:
      an airflow inlet configured to cause an environmental airflow to flow into the airflow generating device;
      a heater communicated to the airflow inlet and configured to heat the environmental airflow to generate a first airflow;
      a humidifier communicated to the heater and configured to humidify the first airflow to generate a second airflow;
      a controller communicated to the humidifier and configured to control a temperature and humidity of the second airflow to generate the condensing airflow according to the temperature of the surface of the test object; and
      an airflow outlet; and
      a fan disposed at the airflow inlet or the airflow outlet and configured to transfer the condensing airflow forcibly; and
   a passage device comprising:
      a passage body communicated to the airflow generating device, wherein the airflow outlet is communicated between the controller and the passage body; and
      at least one uniforming board disposed in the passage body, and configured to receive the condensing air, and each of the at least one uniforming board has at least one first hole;
      a flow-rectifying board disposed at a side of the passage body, wherein the side is far away from the airflow generating device, the flow-rectifying board is configured to receive the condensing airflow passing through the passage body, and a thickness of the flow-rectifying board is greater than a thickness of any of the at least one uniforming board.

8. The condensing system of claim 7, wherein the passage device further comprising:
   a spacer disposed at a side of uniforming board, wherein the side is opposite to the airflow generating device, a vertical projection of the spacer partially covers the at least one first hole.

9. The condensing system of claim 7, wherein the flow-rectifying board has at least one second hole.

10. The condensing system of claim 7, wherein the number of the at least one uniforming board is plural, a first uniforming board of the uniforming boards is farther from the airflow generating device than a second uniforming board of the uniforming boards, and the first uniforming board has more of the at least one first hole than the second uniforming board.

11. The condensing system of claim 7, wherein the number of the at least one uniforming board is plural, a first uniforming board of the uniforming boards is farther from the airflow generating device than a second uniforming board of the uniforming boards, and one of the at least one first hole of the first uniforming board has a smaller size than one of the at least one first hole of the second uniforming board.

12. The condensing system of claim 7, wherein the number of the at least one uniforming board is plural, a first uniforming board of the uniforming boards is farther from the airflow generating device than a second uniforming board of the uniforming boards, and a total area of the at least one first hole on the first uniforming board is greater than a total area of the at least one first hole on the second uniforming board.

* * * * *